Figure 1:
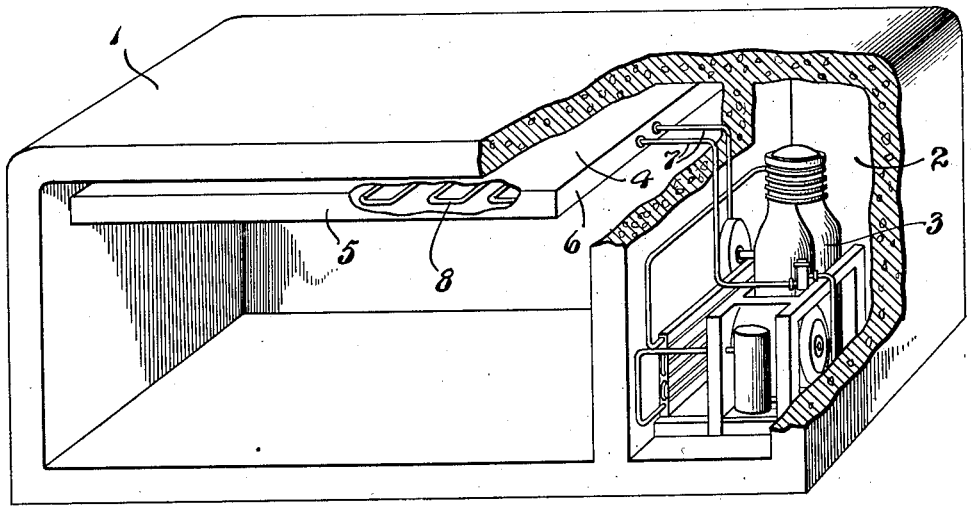

Aug. 7, 1934.  W. G. FINCH  1,969,124
BRINE SOLUTION
Filed Dec. 28, 1931

Inventor
William G. Finch
By Liverance and
Van Antwerp
Attorneys

Patented Aug. 7, 1934

1,969,124

UNITED STATES PATENT OFFICE 1,969,124

BRINE SOLUTION

William G. Finch, Greenville, Mich., assignor to Kold-Hold Manufacturing Company, Lansing, Mich., a corporation of Michigan Application December 28, 1931, Serial No. 583,573

2 Claims. (Cl. 252—5)

The present invention relates to refrigeration and is more particularly concerned with so-called mechanical refrigeration, that is, the refrigeration of an enclosed space wherein articles of food or the like may be kept and preserved at a low degree of temperature by surrounding or introducing into the space a refrigerating medium which is cooled and reduced to a low temperature and is therefore available for absorbing heat which may be in or enter the space.

In mechanical refrigeration the refrigerating medium is ordinarily circulated through pipe coils, utilizing a compressor therefor in conjunction with a radiator for removing the heat which may be absorbed thereby.

With my invention the refrigerating pipe coil is carried into an enclosing container, which is of a relatively thin flat form, having parallel flat sides of considerable area and edge portions connecting the edges of said sides which are narrow in width; and the pipe coil is disposed between said flat sides. This container is to receive and contain an eutectic solution, that is, a solution that will freeze to solid form on attainment to a predetermined low temperature. The container of the form described has amply sufficient properties of expansion to take care of the expansion of the solution on its freezing to solid form.

One particular object and purpose of the present invention is to provide an eutectic solution of a novel character which has a very high latent heat of freezing, one which gives off a large quantity of heat in its change from liquid to solid form and one which, conversely, absorbs a large quantity of heat in its conversion from solid ice form to liquid form.

This is particularly useful and advantageous in conjunction with refrigerators of various types with which mechanical refrigerating units are used, particularly as it is always possible that the power which drives the compressor and the like may be interrupted, or may be accidentally or otherwise disconnected, whereupon, if the refrigerating apparatus is not examined or inspected, the rise in temperature within the enclosed space which is refrigerated will not be noticed and a detrimental rise in temperature may occur; but with an eutectic solution of the character specified frozen and in solid form, such interruption of the power for operating the refrigerating apparatus will not be as detrimental, as the rise in temperature within said refrigerated space will not occur until the frozen eutectic solution has absorbed the large quantity of heat of which it is capable and has been reduced to liquid form, this taking a long time during which any interruption in the current will in all probability be discovered.

For example, refrigerators for grocers, dealers in meat, ice cream and the like located in stores will not ordinarily be in use over the week end, when the store is closed and any interruption in the power operating the refrigerating apparatus is not likely to be discovered. With my invention of eutectic solution, the latent heat of freezing is so great that a complete interruption in the operation of the refrigerating apparatus over such period that the store is closed is unimportant as seldom or never will the solution have been reduced completely to a liquid form over a period of even thirty-six to forty-eight hours; and the temperature desired within the enclosed refrigerating space is maintained constant over such period irrespective of the failure of the refrigerating apparatus to work during such time.

Moreover, with an eutectic solution of the character described the periods of operation of the motor which drives the compressor and the like will be far apart, even though the periods of operation may be longer than would otherwise be, and this is a desirable advantage in mechanical refrigerating apparatus.

A further object of the invention is to provide an eutectic solution in which the ingredients are certain salts, hereinafter named, soluble in water; and by using a greater quantity of water for the same quantity of salts or a less proportion of salts for the same quantity of water, the critical temperature at which the solution will freeze and solidify may be raised. Or, conversely, by using a larger quantity of salts with the same amount of water this temperature may be lowered, permitting a control of the solution for practically any degree of temperature desired.

Figure 2:
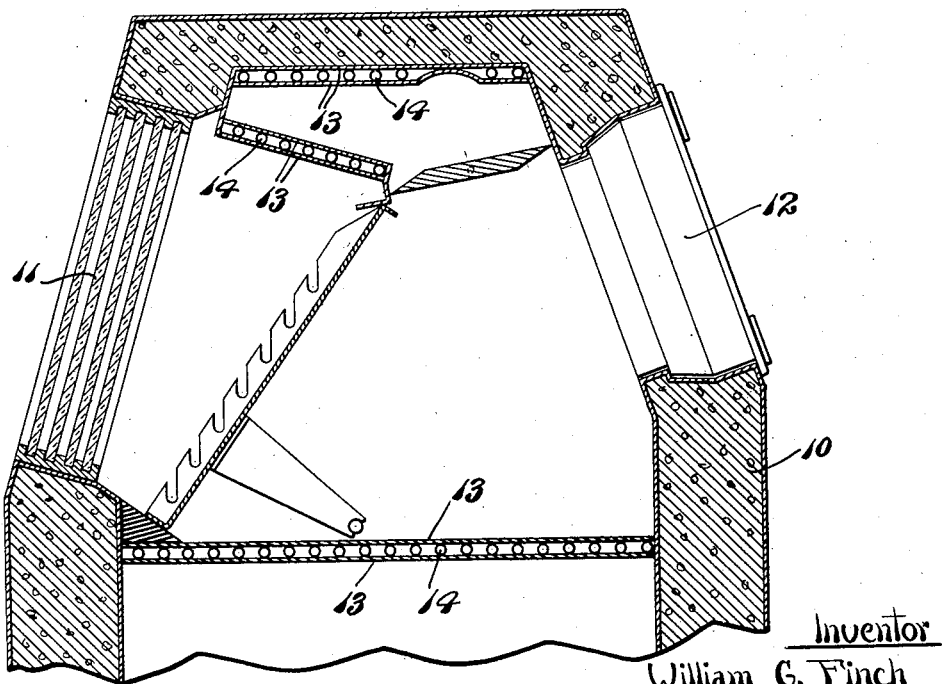

An understanding of the invention may be had from the following description, taken in connection with the accompanying drawing, in which, Fig. 1 is a fragmentary perspective view, with parts broken away and shown in section, showing one application where my invention may be utilized, and Fig. 2 is a fragmentary vertical section through the upper part of a display refrigerator showing another place of application of the invention.

In Fig. 1 an enclosing casing 1 is shown having a compartment 2 at one end in which the mechanical refrigerating apparatus 3 of conventional form is located. In the upper part of the remaining chamber an enclosing container 4 for the eutectic solution is located, preferably at the upper side of the chamber. This container has flat parallel upper and lower sides, preferably of sheet metal, connected at their sides and ends by vertical sides and ends 5 and 6. The container is of relatively narrow width and is adapted to contain the eutectic solution.

The pipes 7 from the refrigerating unit lead into the said container and join with a pipe coil 8 which lies between the upper and lower sides of the container as shown.

In Fig. 2 is shown a refrigerating show case having an outer space enclosing casing 10, in one side of which there is positioned a display opening filled by a transparent unit 11, and with a door 12 for access to the interior space. Several of the flat containers for the eutectic solution may be used in the interior space of the refrigerating show case, having parallel upper and lower sides 13, closed at their edges and with pipe coils 14 lying between the upper and lower sides of the container.

The eutectic solution which is to be contained within said containers and completely surround the pipe coils is a solution of barium chloride, potassium chloride and sodium chloride in water. A solution of this character which will freeze and solidify at zero degrees Fahr. may be made by dissolving nineteen ounces of barium chloride, eighteen ounces of potassium chloride and four ounces of sodium chloride in one gallon of water. This solution is to fill the container substantially at least seven-eighths full. And with the operation of the refrigerating compressor and the like and the circulation of the refrigerating medium through the coils 8 or 14, heat is extracted from the solution until it reaches zero degrees temperature in a liquid state whereupon with the extraction of the further latent heat of freezing of said solution it will solidify. And as previously described the latent heat of freezing of this solution is very great and there will be required an extraction of the very large amount of heat to reduce the solution from a liquid to a solid state before the same becomes entirely frozen and solid.

When this condition has been reached the refrigerating apparatus automatically stops as is common in apparatus of this kind. Before it again starts up the frozen eutectic solution must necessarily all have been reduced to a liquid form and its temperature raised above zero degrees temperature. This will take a considerable time with properly insulated refrigerators. And where a refrigerator is closed, as for instance over holidays or over the week-ends in a store, the amount of heat entering the refrigerated space within a refrigerator will not ordinarily be sufficient to reduce the frozen eutectic solution to its liquid form because of the large quantity of heat that is required for such reduction.

It is also to be noted that when the refrigerator is being used frequently during the day, as is the case with refrigerating show cases in stores, the opening and closing of the door 12 for removing articles which are sold will cause the frozen solution to melt more rapidly than when it is closed overnight or over a holiday or Sunday. This, however, in no way detracts from the value of the invention as during the time the refrigerator or refrigerating show case is being used in a store it is under observation and its interior temperature frequency noted so that if any interruption in the power for operation of the apparatus occurs it is soon discovered. The only effect is that the motor operating the refrigerating apparatus is more frequently in operation than it is overnight or over Sundays and holidays.

It is of course well known that water alone freezes at thirty-two degrees Fahr. If a temperature between thirty-two degrees Fahr. and zero degrees Fahr. is wanted as the freezing point of the solution the salts used for each gallon of water are correspondingly increased. For instance, the use of nine and one-half ounces of barium chloride, nine ounces of potassium chloride and two ounces of sodium chloride per gallon of water makes a solution which freezes at an intermediate point between zero degrees and thirty-two degrees Fahr. Likewise for a solution which will not freeze until a temperature below zero degrees Fahr. is reached the salts may be increased in quantity per gallon of water used. This may be obtained by anyone with a little experimentation.

The invention has proven exceptionally practical and satisfactory, particularly in refrigerating devices which are used in stores where the same at times are not under observation for a period even as long as forty-eight hours. It is especially necessary that frozen meats be maintained at substantially zero degrees temperature and with the eutectic solution which I have devised there is no danger of the temperature within the space in the refrigerator in which the meats, for example, are held rising above said temperature as the capacity of the solution for absorbing heat is sufficient to maintain the required low temperature within the refrigerated space for any period that a store is normally closed.

It is to be understood that the term "refrigerator" as used in the specification and in the claims hereto appended is to include any enclosed insulating chamber which is to be refrigerated. For example the eutectic solution and process of refrigeration which I have invented is very useful in conjunction with trucks in which the body will be of heat insulation material and the interior space will include the refrigerating coils enclosed in the container and surrounded by the eutectic solution. Such truck may be refrigerated at night and may then be used all day without the eutectic solution becoming completely liquid and its temperature elevated above a desired refrigerating temperature. Also refrigerating railway cars may be refrigerated in the same manner or in fact the refrigerating apparatus including the compressor and the like may be intermittently operated when needed by driving from the axle of the car. The invention is therefore applicable to many other places than the common household refrigerator or grocers' or butchers' refrigerators, or refrigerating show cases, and is in no sense limited thereto.

The invention is defined in the appended claims and is to be considered comprehensive of all forms of structure coming within their scope.

I claim:

1. An eutectic solution for refrigerating purposes consisting of a solution of nineteen ounces of barium chloride, eighteen ounces of potassium chloride, and four ounces of sodium chloride dissolved in one gallon of water.

2. An eutectic solution which consists of water in which barium chloride, potassium chloride and sodium chloride are dissolved, the proportions of the barium, potassium and sodium chlorides used being in a ratio of nineteen to eighteen to four, respectively.

WILLIAM G. FINCH.